US012717695B2

(12) United States Patent
Santaus et al.

(10) Patent No.: US 12,717,695 B2
(45) Date of Patent: Aug. 25, 2026

(54) USER-DEFINED LIGHTWEIGHT APPLICATION CHECKPOINTING SYSTEM

(71) Applicant: Dell Products L.P., Round Rock, TX (US)

(72) Inventors: Benjamin E. Santaus, Somerville, MA (US); Emily Minor, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 375 days.

(21) Appl. No.: 18/490,988

(22) Filed: Oct. 20, 2023

(65) Prior Publication Data

US 2025/0130920 A1 Apr. 24, 2025

(51) Int. Cl.
*G06F 11/3604* (2025.01)
*G06F 11/3668* (2025.01)

(52) U.S. Cl.
CPC ...... *G06F 11/3608* (2013.01); *G06F 11/3688* (2013.01)

(58) Field of Classification Search
None
See application file for complete search history.

(56) References Cited

U.S. PATENT DOCUMENTS 6,442,663 B1 * 8/2002 Sun .......................... G06F 9/54 711/202
6,993,487 B2 * 1/2006 Bluvband .............. G10L 13/00 717/124
7,194,664 B1 * 3/2007 Fung .................. G06F 11/3636 714/45
11,080,164 B2 * 8/2021 Raviv ................ G06F 21/6254
2010/0299559 A1 * 11/2010 Randimbivololona ..................... G06F 11/3636 714/E11.208
2012/0192153 A1 * 7/2012 Venkatraman ...... G06F 11/3698 717/124
2019/0286549 A1 * 9/2019 Mola ...................... G06F 21/12
(Continued)

OTHER PUBLICATIONS

G. Deconinck and R. Lauwereins, "User-triggered checkpointing: system-independent and scalable application recovery," Proceedings Second IEEE Symposium on Computer and Communications, Alexandria, Egypt, 1997, pp. 418-423 (Year: 1997).*
(Continued)

*Primary Examiner* — Andrew M. Lyons
(74) *Attorney, Agent, or Firm* — Workman Nydegger

(57) ABSTRACT

Techniques for achieving improved checkpointing are disclosed. A library that has been implemented in a process is accessed. This library facilitates checkpoint-and-resume functionality to enable the process to checkpoint itself. Tags are used to annotate code of the process. The tags define which data of the process is to be saved in an event in which the process terminates in an unexpected manner. The tags define a block within the code and define the data that is to be saved. After the data has been saved, the process terminates unexpectedly. The process restarts from its beginning state and is progressed through its code. This progression includes skipping code for which data was previously saved. The process continues to progress and to skip through the code until reaching the defined block. At that point, the process resumes at the defined block, such that the process resumes at a user-defined location.

20 Claims, 5 Drawing Sheets

(56) References Cited

U.S. PATENT DOCUMENTS

| | | | | |
|---|---|---|---|---|
| 2020/0257615 | A1* | 8/2020 | Richardson | G06F 11/323 |
| 2022/0245051 | A1* | 8/2022 | Calvano | G06F 9/45558 |

OTHER PUBLICATIONS

G. Chen, J. Zhang, Q. Lin, H. Jiang and C. Pang, "CRState: In-Kernel Checkpoint/Restart of OpenCL Program Execution on GPU," 2019 IEEE 25th International Conference on Parallel and Distributed Systems (ICPADS), Tianjin, China, 2019, pp. 335-342. (Year: 2019).*

M. Maroñas, S. Mateo, V. Beltran and E. Ayguadé, "A Directive-Based Approach to Perform Persistent Checkpoint/Restart," 2017 International Conference on High Performance Computing & Simulation (HPCS), Genoa, Italy, 2017, pp. 442-451. (Year: 2017).*

* cited by examiner

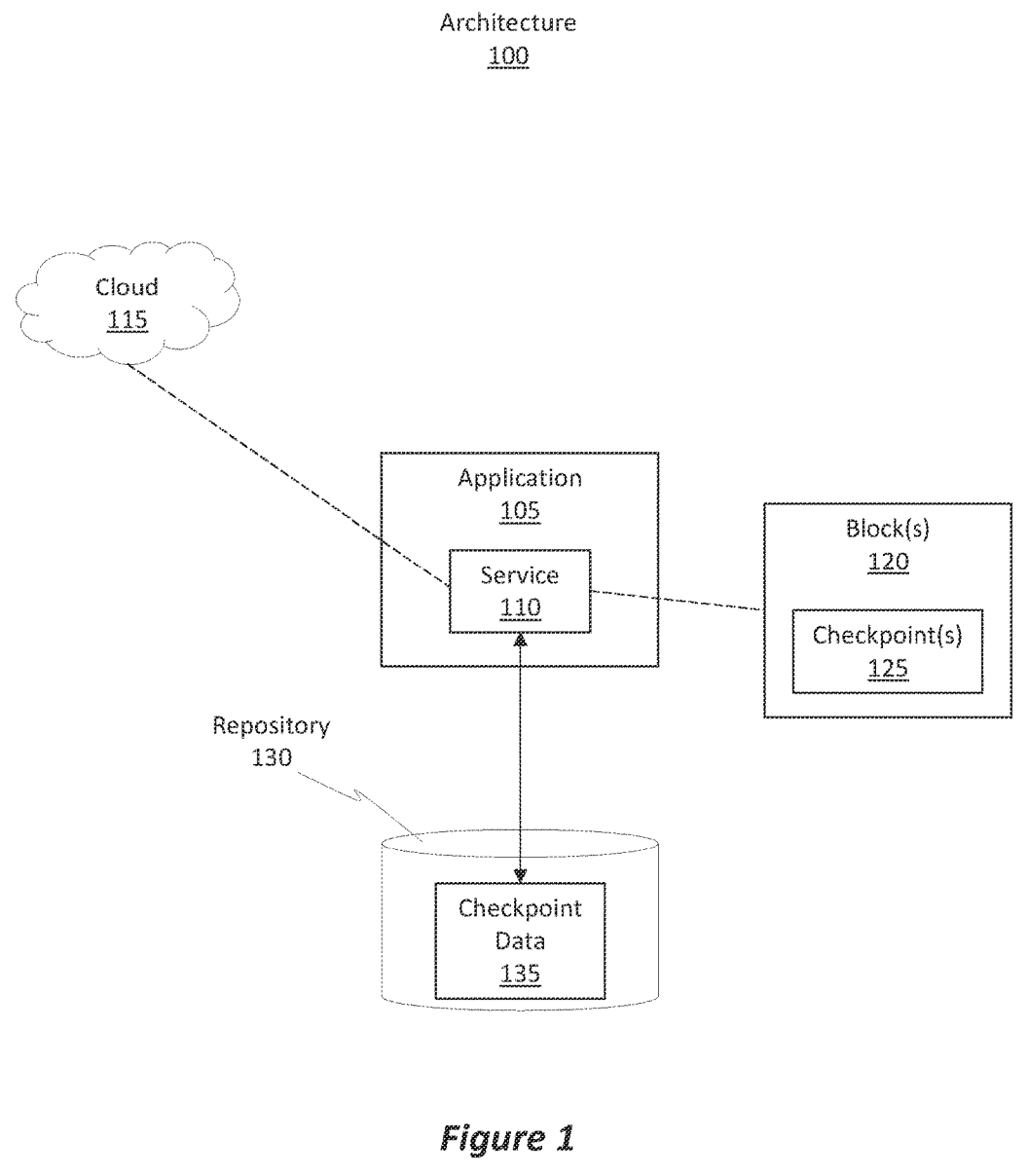

Architecture 100

Cloud 115

Application 105

Service 110

Block(s) 120

Checkpoint(s) 125

Checkpoint Data 135

Repository 130

Figure 1

USER-DEFINED LIGHTWEIGHT APPLICATION CHECKPOINTING SYSTEM

FIELD OF THE INVENTION

Embodiments of the present invention generally relate to checkpointing code. More particularly, at least some embodiments of the invention relate to systems, hardware, software, computer-readable media, and methods for implementing a library into a process to enable the process to checkpoint itself.

BACKGROUND

A common problem in software development is handling a process's state and data when the computer it is running on has an electrical or hardware issue. When these issues occur, processes running on the machine are interrupted and must recover either immediately or when the computer is rebooted. This leaves application writers in the undesirable position of being responsible for the consequences of failures beyond their control.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 illustrates an example architecture for implementing a library into a process to enable the process to checkpoint itself.

DETAILED DESCRIPTION OF SOME EXAMPLE EMBODIMENTS

Figure 2:
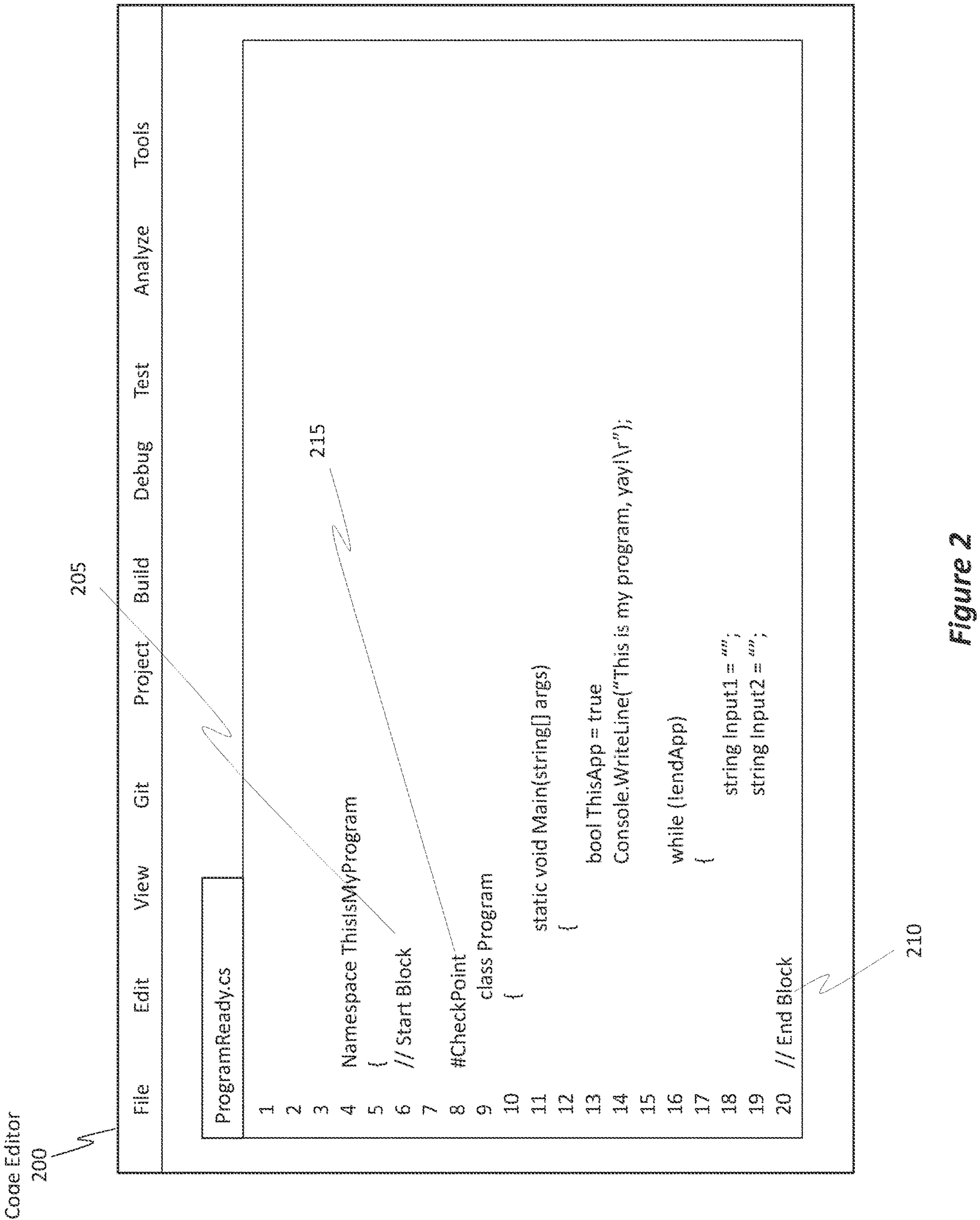
FIG. 2 illustrates an example set of code in which a block is being defined using tags.

Checkpoint-and-resume software packages capture a running process's state so that the process can be resumed from that state at some point in the future. These packages, whether already packaged as an application or provided as a library with which to build one, are utilities that run in parallel with the process that is being checkpointed. Stated differently, existing checkpointing methodologies rely on external packages to perform the checkpointing operations; existing systems do not currently allow a process to checkpoint itself. As used herein, the terms "application" and "program" can be used interchangeably and generally refer to code or text or the execution thereof. A "process" is typically viewed as being an instance of a program, though a process can also run a portion of a program's instructions rather than the full program.

Checkpointing systems that run as a separate process are limited in their flexibility as well as their utility. Since the checkpointing process has little to no insight into the current state of the process being checkpointed, the entire state of that process must be recorded. This encapsulation of an entire process results in a large amount of data being saved. As a consequence, traditional checkpointing processes are often quite cumbersome and resource intensive.

Traditional checkpoint-and-resume solutions are largely standalone applications that can interrupt running processes to create checkpoints from them, then recreate the process and its memory map to restart the process where it was checkpointed. For the most common of these implementations, application programming interfaces (APIs) exist that can be used to perform these operations as parts of programs. However, this technique is still with the intention of checkpointing a separate process rather than the program using its own library.

Additionally, although a checkpointing process can be scheduled or run automatically, its utility is limited by not having the ability to checkpoint a process at a specific line or block of code. A process that has been checkpointed using existing systems is resumed only from exactly where it left off even if that location might be disadvantageous, such as in a scenario where the process immediately enters an error condition. Because a developer does not know exactly where the process will resume, the developer cannot mitigate issues that might arise when the process comes back.

As a simple example, if a process were to be in the middle of performing some operation on a file, when it was resumed, there is no guarantee that the file object is actually open. This could cause the process to resume and then immediately crash once again.

A more useful system would allow developers to prepare their own code for the case in which the process is resuming mid-flight or even guide the program to resume at a specific location. In essence, the more useful system allows the developer to ensure data and object integrity in any circumstances while writing the code.

One problem that the disclosed embodiments address is that existing checkpointing tools cannot be built into applications to determine when their state is saved. For example, not every component of a program can be quickly recreated when an application resumes from a checkpoint. The lack of developer involvement in deciding when and how an application may resume limits the utility of existing solutions. If the developer does not know when the checkpoints will occur or where the program may resume, that developer cannot provide mechanisms after a checkpoint for the purpose of recreating objects that may have been lost when the application was interrupted. As will be described in more detail shortly, the disclosed embodiments address this issue.

Another problem that the disclosed embodiments address is that existing checkpointing tools do not automatically save application state; rather, they must be manually triggered by a separate process. While this does not inhibit other checkpointing solutions from functioning as their designers intended, it does create a significant problem when applying checkpointing tools to crash consistency. If the checkpoint is user-triggered from a separate process, it is significantly less useful for the purposes of creating crash-resilient applications than an implementation that automatically saves application state at specified locations in the application's code.

Yet another problem is that existing checkpointing tools dump the entirety of the application's state and can consume considerable storage. External checkpointing tools have no access to the application-level logic implied and known by that application's developer. Therefore, they must save the entire state of the application for fear of omitting a critical piece of data. This, however, is not an insignificant data dump and for storage-constrained applications this may make utilizing checkpointing software unfeasible. This also may store significant bloat that is not important and may simply be wasted storage space.

Another problem is that existing checkpointing tools are platform-dependent. Many existing checkpointing tools depend on a specific operating system or instruction set architecture to function correctly. This makes them useless for applications that run on other systems.

The disclosed embodiments provide numerous benefits, advantages, and practical applications to the technical field of backup control, and in particular to checkpointing. Notably, the embodiments provide various solutions to the problems recited above. Beneficially, the disclosed embodiments are directed to an improved checkpoint-and-resume software library that enables processes to checkpoint themselves. The disclosed library is beneficially able to provide a set of tags that the developer can use to both annotate and augment the structure of a program to specify which data is to be saved and when.

Advantageously, and in accordance with the disclosed principles, if an augmented application crashes, that application can be directly started again, and it will be progressed until the application reaches its most recently saved state. As another benefit, during the restart and progression of the application, the application can skip code that was previously run (and for which state has been saved), and the application can resume at the beginning of the block of code that was executing at the time of the previous instantiation's end. Unlike other checkpoint-and-resume offerings, there are no additional commands or processes that need to be run to either save or restore a process's state outside of running the application.

In this regard, the disclosed embodiments beneficially provide a checkpointing library for use by application developers. Rather than saving the entire program state, the embodiments save the data (e.g., variables, metadata, and perhaps other program state) specified by a user and some metadata about the last completed block of code. The developer can specify when these checkpoints should happen. By doing so, the library dramatically reduces the amount of data being checkpointed as well as ensures that the application resumes at a known, stable point within the code, without the need for a second, external process. Accordingly, these and numerous other benefits will now be described in more detail throughout the remaining portions of this disclosure.

Stack Frame

As used herein, the phrase "stack frame" refers to a technique for managing memory. A stack frame helps to generate and possibly eliminate temporary variables.

Resetting the stack frame, which (as mentioned above) is a data structure containing a process' data and function call stack, is a step that is performed to resume a terminated process from where it left off. Generally, there are at least two ways to go about resetting the stack frame. One technique is to recreate the stack frame. Another technique is to reload the stack frame.

Between the two options, reloading the stack frame is generally recognized as being the easier option, because the reloading process entails snapshotting the entirety of the stack frame and placing it back in memory when the process is to resume. This snapshot can be a considerable amount of data to capture and store, but since the entire stack frame is known, it is less likely that anything will be missed. It is often more difficult for a checkpointing process to attempt to interpret the current state of a separate process and to recreate it, as is performed in the recreation technique.

As will be discussed in more detail shortly, the disclosed embodiments use a hybrid technique between recreating and reloading the stack frame. This new and improved technique saves information the developer specifies as relevant and leverages the application's code itself to allow other pieces of data to be reset by the normal execution of the process. Though not an immediate jump back into the process, the embodiments allow the process to quickly skip ahead to an approximate point at which the process left off, thereby allowing the process to resume from that point.

Variable Scoping Rules

Variables in many languages may not be used outside of the block in which they were declared. In compiled languages, doing this generally results in compiler error. The disclosed embodiments are able to leverage variable scoping to protect developers from accidentally using a variable whose value may not have been restored in a resumed process.

Checkpoint/Restore in Userspace (CRIU)

CRIU operates as either a command-line utility or as part of a separate application that pauses a process and that stores it to disk as a collection of files. The system is then able to restore this application from where it exited. A user who wants to create a checkpoint of a running process with CRIU is required to run a command manually to do so. CRIU, once prompted, creates the snapshot of the process' state and terminates the application gracefully.

Therefore, CRIU is not entirely helpful in the case that the application crashes, as in order to restore the process, one must have made a checkpoint recently. Additionally, re-running the process normally does not automatically restore it from the collection of files; rather, restoration must be performed by the CRIU utility.

Example Architectures

Attention will now be directed to FIG. 1, which illustrates an example architecture 100 in which the disclosed principles may be employed. Architecture 100 shows an application 105 (or any type of process) and a service 110.

As used herein, the term "service" refers to an automated program that is tasked with performing different actions based on input. In some cases, service 110 can be a deterministic service that operates fully given a set of inputs and without a randomization factor. In other cases, service 110 can be or can include a machine learning (ML) or artificial intelligence engine. The ML engine enables service 110 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 110 is a cloud service operating in a cloud environment 115. In some implementations, service 110 is a local service operating on a local device. In some implementations, service 110 is a hybrid service that includes a cloud component operating in the cloud and a local component operating on a local device. These two components can communicate with one another.

Service 110 is shown as being or at least including any type of plugin, add-on, or library that is included as a part of the application 105. Service 110 can be used to augment a program or application (e.g., application 105) with built-in checkpoint-and-resume features. In particular, service 110 provides a framework by which a developer is able to divide his/her program into notable block(s) 120 which may or may not correspond to functions in the code. Checkpoint(s) 125 can be specified within these block(s) 120 to denote points at which it is worth saving the program's progress. At the top of each block, the developer is able to provide a list of variables used within the block that should have their values tracked and saved at the specified checkpoints. That information can be saved in the repository 130, as shown by checkpoint data 135.

When application 105 has been annotated with these meta-structure tags, the checkpointing system preprocessor (e.g., included as a part of service 110) can be run on the application's code. Service 110, and in particular the preprocessor, evaluates the tags and generates the corresponding code for each so that the checkpointing features are incorporated into application 105. The developer can then build and run application 105 as normal. If application 105 is killed in the middle of execution, the developer can run application 105 again to restore the state of the program as it existed at its most recent checkpoint.

Program Meta-Structure Tags

Developers know which components of their code take the most time and the points during those components at which it is most effective to checkpoint their progress. These components could be a single function or a collection of functions and there may be only one or many variables utilized in those components that need their values saved. The tags disclosed herein are designed to allow developers to draw those boundaries and to determine those checkpoints for themselves.

Using the provided tags, developers can divide their code into blocks. As used herein, the term "block" is defined as a section of code with at least one checkpoint. Developers can, at the start of any block, optionally declare variables that are to be saved. In a block, a developer is able to checkpoint or enter another block, at which the process recurses.

An annotated field program defines a meta-structure for application 105 that service 110 uses to maintain its own representation of the state of application 105. While application 105 executes, service 110 executes code to maintain a log describing the application 105's progress through the meta-structure defined blocks and checkpoints. At each checkpoint tag, service 110 writes this log of application state to persistent storage, as shown by checkpoint data 135 in repository 130. The log (e.g., checkpoint data 135) contains the current stack frame analog describing which block application 105 is in as well as the most recently passed checkpoint within that block. Also in this log are the values of each variable in each block that has been marked for checkpointing.

Blocks

In the program meta-structure, blocks take up a similar space as functions do in application 105. While application 105 executes, it maintains a stack frame generally made up of functions and their variables. Service 110, when incorporated into application 105, performs a similar operation in which service 110 maintains the current state of application 105 as defined by which block(s) application 105 is currently in and the variables associated with each. At each checkpoint, service 110 writes out this information (e.g., current block, checkpoint within block, values of all saved variables) to the repository 130.

Historically, obtaining the actual line (or block) of code at which application 105 left off on is not a simple task. The disclosed embodiments allow the user to specify sections of code (e.g., checkpoints); therefore, instead of resuming exactly where application 105 exited, application 105 is caused to resume at the beginning of the last executed checkpoint using the information that has been stored in repository 130. The location of this most recent (or last executed) checkpoint is determined by the developer via service 110. The developer is able to ensure that this checkpoint occurs at a point within the code that will enable application 105 to resume smoothly.

In some embodiments, the following categories of markers can be used to implement the disclosed meta-structure. These categories include start and end, enter and exit, track variables, and checkpoint. Further details on these categories will be provided below.

Regarding the start/end of a block category, blocks may have a defined start and end so that when the file corresponding to the application 105 is parsed, the preprocessor knows which checkpoints belong to which blocks and can assign identifiers to them appropriately. As mentioned, the boundaries of a block are not required to align with functions. A subset of a function can be its own block, and a function is not required to be a block. In some implementations, an entire function can be included in a block. In some cases, multiple functions can be included in a block.

Deciding which pieces of code should or should not be included in blocks is primarily up to the developer, though if a function contains a checkpoint, it is typically its own block. This is because checkpoints belong to one block. If a checkpoint was allowed to exist outside of a block, the hierarchy used to maintain program state might break.

In some implementations, machine learning can be used to intelligently analyze the code and determine where to define a block's boundaries. For instance, the machine learning engine can determine where a block is to start and where a block is to end.

Regarding the enter/exit block category, these tags can potentially be wrapped up with the start/end tags if the preprocessor was designed to do so. Service 110 is alerted when application 105 enters or exits a block so that service 110 can update its representation of application 105's state with the most recently completed checkpoint. Since it is possible to enter blocks from multiple locations within the code, it is not desirable to simply store which block the process left off in. The entering or exiting of a block appends that block to the list of blocks marking application 105's current progress.

Regarding the track variables category, at the beginning of each block, developers may specify variables whose values they wish to track throughout the execution of the block. Any variable with an easily serializable value is preferable, though extending this functionality to more complicated data structures can be performed. These values can also be used safely anywhere within a block once they have been declared as the embodiments guarantee their restoration if the process resumes.

Regarding the checkpoint category, checkpoints mark locations in the code where the current state of application 105, as tracked by service 110, is to be written to storage. If application 105 is killed between one checkpoint and the next, the next time application 105 begins, service 110's meta-structure will check the recovered application/program state and will skip forward to the section of code following the last logged checkpoint.

Preprocessor

The preprocessing step performs a code generation pass on application 105, thereby converting the meta-structure tags (e.g., start/end block, etc.) to appropriate code. The generated code performs the data management and implements the additional application structure referenced by the tags. For example, each instance of the tag, which allows users to specify variables to track in a given block, expands into code. This code then adds each variable to a registry inside the block abstraction. The result of the preprocessing step is a modified application that includes checkpointing code. The modified application does not remove or rework any of the user's code.

Effects of Generated Code on Process Execution

When the modified application 105 is run, the state of application 105 is maintained by the generated code along with the actual work the user wrote the application 105 to perform. At checkpoints, this application 105 state, which encapsulates the current values of tracked variables as well as the block and checkpoint the application last passed, is written to storage.

If application 105 crashes during execution and is restarted, the generated code (e.g., by way of service 110) will first look for a record of a previous incarnation of application 105. If service 110 finds one, service 110 will read the encapsulation of the previous state and set its own markers for the block and checkpoint at which application 105 will resume.

Notably, application 105 does not start immediately from where it crashed; instead, application 105 resumes at its start and progresses through its code. The generated code is structured in such a way that the resumed process skips any code which service 110 knows has already been executed while restoring the values of tracked variables along the way. When application 105 reaches the block and checkpoint at which it left off, the tracked variables are guaranteed to have been reset, and application 105 then begins executing the rest of the process from that point.

This type of checkpointing is, therefore, quite different from existing solutions in that application 105 resumes not at an exact instruction but rather at a user defined point within the code that is close to where application 105 died. Developers are then able to place their checkpoints strategically to accomplish two goals.

One, the developers are able to coordinate their checkpoints and tracked variables in such a way as to not require saving large data structures if they do not have to. If a large amount of data is necessary for a specific section of code, then the variable(s) comprising that data can be effectively "checkpoint-local" and can exist only within that checkpoint's section of code. Generally, users have leeway in which pieces of data are stored and can organize their program's checkpoints to accommodate that data.

Two, developers are able to more safely resume their applications/processes because not all variables can be checkpointed successfully. A program may use an ephemeral (e.g., such as a socket connection). The process of resurrecting the data structure representation does not automatically reestablish this connection, however. If application 105 dies while that connection is open and if an instruction attempts to use that connection once application 105 resumes, the resumed process for application 105 will fail. At that point, the checkpoint is essentially useless. By following the disclosed principles, users can checkpoint their code in such a way that either avoids the above problems entirely (e.g., such as by performing all of the work with an ephemeral object in one checkpoint) or by writing additional code around checkpoint boundaries to ensure process integrity.

Additional Details

Existing checkpoint-and-resume solutions act as an external process on a running application to snapshot the latter's state and to save it in order to resume it at a later point. There are two disadvantages to doing so. One is that the external process must capture the entirety of the application's state to resume it successfully. The other is that this process (both checkpointing and resuming) is separate from the application being checkpointed.

The disclosed embodiments address both of those disadvantages by allowing users to augment their applications with built-in checkpoints that can be skipped when the application resumes after exiting early. Since the stack frame builds with each block the process enters, the integrated service naturally rebuilds the process's stack frame as it progresses through the already-completed parts of the application. When the application arrives back at the most recent checkpoint, all saved data is placed back in its correct location, and the process can continue running the code within checkpoints.

Also, by allowing the users to modify their own program structure and to specify locations at which the code should resume if it crashes (e.g., by defining checkpoints), the embodiments make checkpointing a much more viable utility for developers. Existing checkpoint-and-resume tools do not account for program state at exit and likely have not taken a snapshot of program state at a point from which it would be advantageous to resume. There may be data structures or objects (e.g., file handlers) that relied on system utilities or other machines; yet, these do not have their state restored in a usable way. The embodiments involve the user in this process so that they can protect the restarted process from using invalid objects.

Existing checkpoint-and-resume software tools also mandate that the entirety of a process's stack frame and data be captured to create a checkpoint. The disclosed embodiments have no such requirement. For example, the embodiments are able to organize an application in such a way that no variable values must be recorded. At the least, users are able to choose which data is saved and which data is not saved and can make decisions on overall program structure to minimize the size of these selections. This is a tremendous improvement in a user's control over their checkpointing and provides additional flexibility to store as much or as little as desired.

Because the disclosed checkpointing system does not use any operating-system-specific calls, it is machine-agnostic and will function regardless of which system the executable is built for. This makes the code that application developers write with this library portable and more useful on more machines. This additionally opens the possibility of running this code in various mediums as well, like containers or accelerators.

Example User Interfaces

FIG. 2 shows an example code editor 200 that is provided for illustrative purposes. In the code editor 200, a developer has added a set of tags, such as tag 205 and tag 210. These tags 205 and 210 are being used to define the start and end of a block. Furthermore, these tags are embedded in a comment of the code. The embodiments are able to parse out the comments to detect these tags. FIG. 2 also shows a checkpoint 215 included in the defined block.

Figure 3:
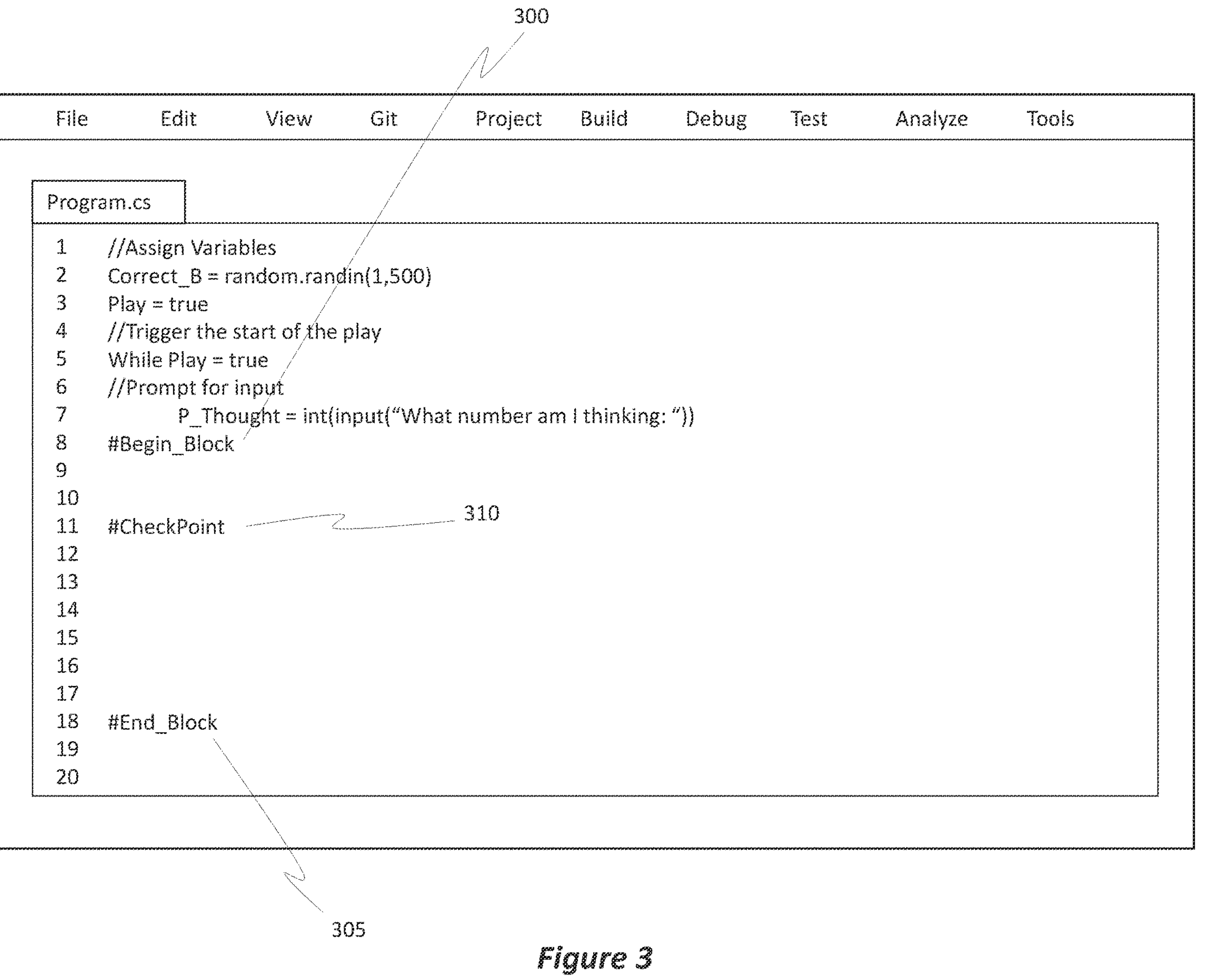
FIG. 3 illustrates another set of code.

FIG. 3 shows another example scenario involving a tag 300 and a tag 305. These tags 300 and 305 are also defining a block. Optionally, the tags can reside outside of a comment and can use program code for their definition. FIG. 3 also shows an example checkpoint 310 included in the defined block.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
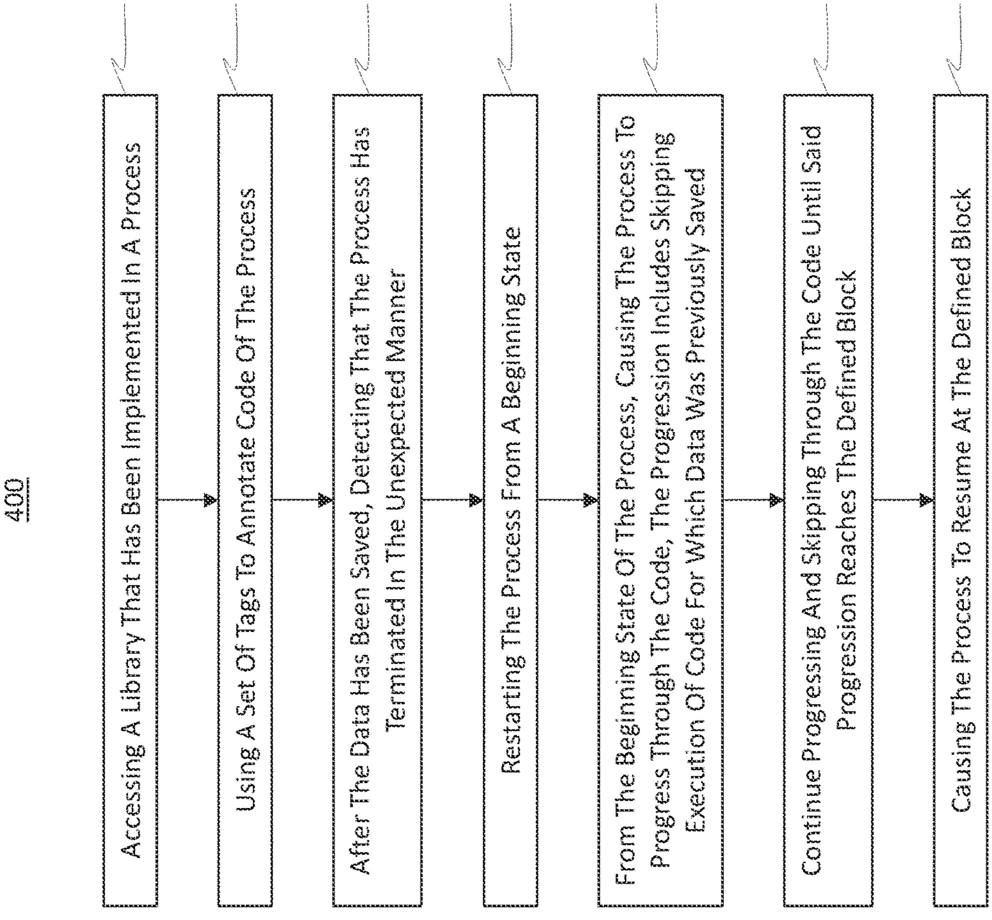
FIG. 4 illustrates a flowchart of an example method for enabling a process to checkpoint itself.

Attention will now be directed to FIG. 4, which illustrates a flowchart of an example method 400 for incorporating a library into a process or application to enable that application to checkpoint itself. Method 400 can be implemented within the architecture 100 of FIG. 1. More particularly, method 400 can be performed by the service 110 of FIG. 1.

Method 400 includes an act (act 405) of accessing a library residing as a part of a process/application, such as a library that is an add-on or a plug-in. In some cases, the embodiments may facilitate the implementation of the library into the process and then access that library. The library facilitates checkpoint-and-resume functionality to enable the process to checkpoint itself via the implemented library.

Act 410 includes using a set of tags to annotate code of the process. The set of tags define which data of the process is to be saved in an event in which the process terminates in an unexpected manner. The set of tags includes a first set of tags defining a block within the code. Optionally, the block includes an entire function. Optionally, the block includes a sub-part of a function. Optionally, the block includes multiple functions.

The set of tags further includes a second set of tags defining the data that is to be saved. At least some of the tags in the set of tags are added to the code in a form of a comment. Optionally, the data that is defined to be saved includes variable data.

The set of tags are further configured to enable a declaration as to when the data that is defined is to be saved. In some cases, the data that is saved is different than an entire program's state. The data that is saved may include one or more of variable data, metadata, or a sub-portion of program state. The data that is saved may include metadata about a last completed block of code that was executed prior to the process terminating in the unexpected manner. Optionally, at a top section of the block, the set of tags identify one or more variables whose values are to be saved.

After the data has been saved, act 415 includes detecting that the process has terminated in the unexpected manner. This act of detecting that the process has terminated in the unexpected manner may include detecting that the process has crashed. In some cases, the computer system running the process crashes or some other computing entity crashes or terminates (e.g., perhaps a network connection).

Prior to the process terminating in the unexpected manner, a log describing a progress of the process is maintained. The log details the process's initial progress (prior to the termination) through the set of tags. That is, the initial progress occurs prior to the process terminating in the unexpected manner. The log can include a current stack frame describing which block the process is in as well as a most recently passed checkpoint within that block. The log may further include values of each variable in each block that has been marked for checkpointing by the set of tags.

Act 420 includes restarting the process from a beginning state. That is, the process is restarted from its beginning.

From the beginning state of the process, act 425 includes causing the process to progress through its code. This progression includes skipping execution of code for which data was previously saved. Code portions whose data is not included in the data that is defined and saved are executed during the progression, such that the data for those code portions is reset during the progression.

Act 430 includes continuing to progress and to skip through the code until the progression reaches the defined block.

Act 435 then includes causing the process to resume at the defined block, which is user defined such that the process resumes at a location in the code defined by the user. By performing the disclosed operations, the process does not immediately resume at the point where it last left off; rather, the process is restarted from its beginning until it reaches a user-defined point (e.g., the checkpoint) at which the process is to continue. That being said, the embodiments enable the process to skip various code segments, resulting in the restart process still being quite fast while enabling the process to checkpoint itself.

Additional Examples

One of the benefits for this work relates to advanced container orchestration. Historically, there has not been a workable way for a containerized application to be paused and to be restarted in a way that frees up resources for use by other applications. A cluster orchestrator may wish to do this in the case that there is higher-priority work that is to be done in the cluster, and some jobs need to be put on hold. If that lower-priority work was checkpointed using this application and if the most recent state was saved in a persistent volume, then the cluster orchestrator could simply remove the pod. When resources free up again, the pod could be recreated and could resume from where it left off based on the persistent volume's stored data.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
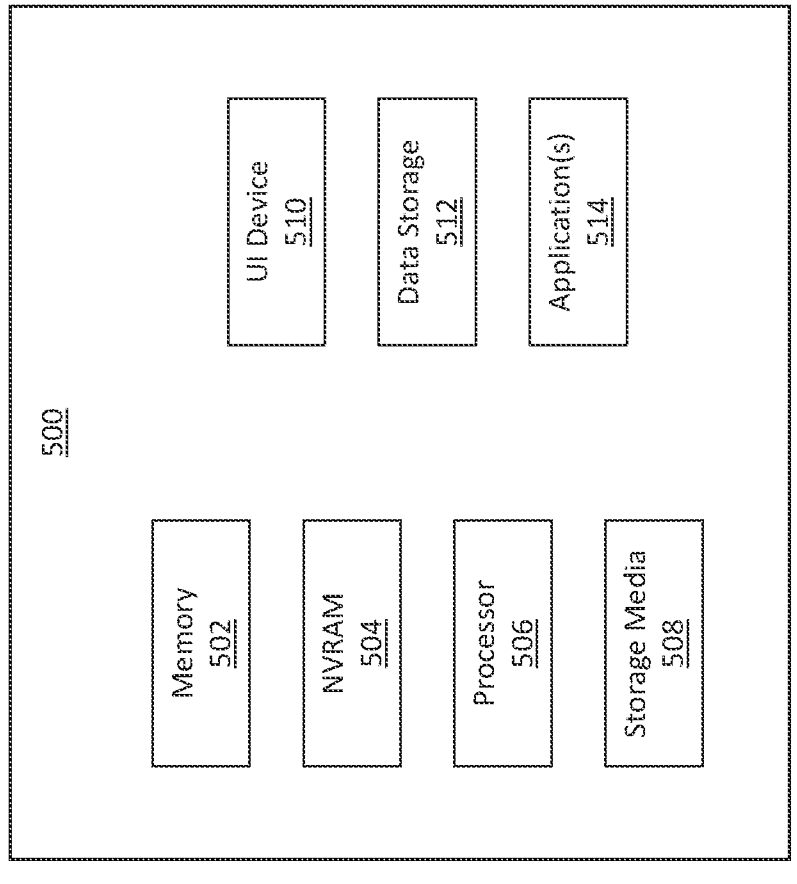
FIG. 5 illustrates an example computer system that can be configured to perform any of the disclosed operations.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. Also, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory 502 of the physical computing device 500 may take the form of solid-state device (SSD) storage. Also, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The physical device 500 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

implementing a library into a process, wherein the library facilitates checkpoint-and-resume functionality to enable the process to checkpoint itself via the implemented library;

using a set of tags to annotate code of the process, the set of tags defining which data of the process is to be saved in an event in which the process terminates in an unexpected manner, wherein the set of tags define blocks within the code, identify variables at a beginning of each block to be saved, and define checkpoint locations within the blocks;

executing a preprocessing operation that converts the tags into executable code that maintains a log describing progress of the process through the blocks and checkpoints including an identification of a current block and a most recently passed checkpoint within that block;

after the data has been saved, detecting that the process has terminated in the unexpected manner;

restarting the process from a beginning state;

from the beginning state of the process, causing the process to progress through the code, including skipping execution of code for which data was previously saved;

continue progressing and skipping through the code until said progression reaches the defined block; and causing the process to resume at a beginning of the defined block corresponding to a most recently passed checkpoint, wherein values of variables identified by the tags are restored and other data is reset through execution of the process.

2. The method of claim 1, wherein detecting that the process has terminated in the unexpected manner includes detecting that the process has crashed.

3. The method of claim 1, wherein at least some of the tags in the set of tags are added to the code in a form of a comment.

4. The method of claim 1, wherein the data that is defined to be saved includes variable data.

5. The method of claim 1, wherein the set of tags is further configured to enable a declaration as to when the data that is defined is to be saved.

6. The method of claim 1, wherein the data that is saved is different than an entire program's state.

7. The method of claim 1, wherein the data that is saved includes one or more of variable data, metadata, or a sub-portion of program state.

8. The method of claim 1, wherein the data that is saved includes metadata about a last completed block of code that was executed prior to the process terminating in the unexpected manner.

9. The method of claim 1, wherein code portions whose data is not included in the data that is defined and saved is executed during said progression, such that the data for those code portions is reset during said progression.

10. The method of claim 1, wherein, at a top section of the block, the set of tags identify one or more variables whose values are to be saved.

11. A method comprising:

accessing a library that has been implemented in a process, wherein the library facilitates checkpoint-and-resume functionality to enable the process to checkpoint itself via the implemented library;

using a set of tags to annotate code of the process, the set of tags defining which data of the process is to be saved in an event in which the process terminates in an unexpected manner, wherein the set of tags define blocks within the code, identify variables at a beginning of each block to be saved, and define checkpoint locations within the blocks;

execute a preprocessing operation that converts the tags into executable code that maintains a log describing progress of the process through the blocks and checkpoints including an identification of a current block and a most recently passed checkpoint within that block;

after the data has been saved, detecting that the process has terminated in the unexpected manner;

restarting the process from a beginning state;

from the beginning state of the process, causing the process to progress through the code, including skipping execution of code for which data was previously saved;

continue progressing and skipping through the code until said progression reaches the defined block; and causing the process to resume at a beginning of the defined block corresponding to a most recently passed checkpoint, wherein values of variables identified by the tags are restored and other data is reset through execution of the process.

12. The method of claim 11, wherein, prior to the process terminating in the unexpected manner, a log describing an initial progress of the process is maintained, said log detailing the initial progress of the process through the set of tags, the initial progress occurring prior to the process terminating in the unexpected manner.

13. The method of claim 12, wherein the log includes a current stack frame describing which block the process is in as well as a most recently passed checkpoint within that block.

14. The method of claim 13, wherein the log further includes values of each variable in each block that has been marked for checkpointing by the set of tags.

15. The method of claim 11, wherein the block includes an entire function.

16. The method of claim 11, wherein the block includes a sub-part of a function.

17. The method of claim 11, wherein the block includes multiple functions.

18. A computer system comprising:

one or more processors; and one or more hardware storage devices that store instructions that are executable by the one or more processors to cause the computer system to:

access a library that has been implemented in a process, wherein the library facilitates checkpoint-and-resume functionality to enable the process to checkpoint itself via the implemented library;

use a set of tags to annotate code of the process, the set of tags defining which data of the process is to be saved in an event in which the process terminates in an unexpected manner, wherein the set of tags define blocks within the code, identify variables at a beginning of each block to be saved, and define checkpoint locations within the blocks;

executing a preprocessing operation that converts the tags into executable code that maintains a log describing progress of the process through the blocks and checkpoints including an identification of a current block and a most recently passed checkpoint within that block;

after the data has been saved, detect that the process has terminated in the unexpected manner;

restart the process from a beginning state;

from the beginning state of the process, cause the process to progress through the code, including skipping execution of code for which data was previously saved;

continue to progress and to skip through the code until said progression reaches the defined block; and cause the process to resume at a beginning of the defined block corresponding to a most recently passed checkpoint, wherein values of variables identified by the tags are restored and other data is reset through execution of the process.

19. The computer system of claim 18, wherein, prior to the process terminating in the unexpected manner, a log describing a progress of the process is maintained, said log detailing the progress of the process through the set of tags.

20. The computer system of claim 19, wherein the log includes a current stack frame describing which block the process is in as well as a most recently passed checkpoint within that block.

* * * * *